United States Patent
Jang et al.

(10) Patent No.: US 8,306,034 B2
(45) Date of Patent: Nov. 6, 2012

(54) METHOD FOR UPDATING AND MANAGING SYNCHRONIZATION IDENTIFIER BY USING RELEASE MESSAGES OR STATUS REQUEST AND RESPONSE

(75) Inventors: Ke-Chi Jang, Plano, TX (US);
Chung-Ching Wang, Plano, TX (US);
Mini Vasudevan, Plano, TX (US)

(73) Assignee: Apple Inc., Cupertino, CA (US)

( * ) Notice: Subject to any disclaimer, the term of this patent is extended or adjusted under 35 U.S.C. 154(b) by 2425 days.

(21) Appl. No.: 10/886,412

(22) Filed: Jul. 7, 2004

(65) Prior Publication Data

US 2005/0025192 A1 Feb. 3, 2005

Related U.S. Application Data

(60) Provisional application No. 60/485,864, filed on Jul. 9, 2003.

(51) Int. Cl.
*H04L 12/28* (2006.01)
(52) U.S. Cl. .................................. 370/395.3; 370/503
(58) Field of Classification Search .................. 370/503, 370/395.3
See application file for complete search history.

(56) References Cited

U.S. PATENT DOCUMENTS

| | | | | |
|---|---|---|---|---|
| 5,953,665 | A * | 9/1999 | Mattila | 455/434 |
| 6,249,681 | B1 * | 6/2001 | Virtanen | 455/466 |
| 2003/0035393 | A1 * | 2/2003 | Sinnarajah et al. | 370/335 |
| 2003/0143989 | A1 * | 7/2003 | Ho et al. | 455/418 |
| 2003/0207696 | A1 * | 11/2003 | Willenegger et al. | 455/522 |
| 2003/0235161 | A1 * | 12/2003 | Shoji et al. | 370/329 |
| 2004/0062227 | A1 * | 4/2004 | Sayeedi | 370/350 |
| 2004/0081079 | A1 * | 4/2004 | Forest et al. | 370/216 |
| 2004/0109423 | A1 * | 6/2004 | Sayeedi et al. | 370/328 |

FOREIGN PATENT DOCUMENTS

| | | |
|---|---|---|
| EP | 1 056 243 A2 | 11/2000 |
| EP | 1 246 487 A2 | 10/2002 |
| WO | WO 2004/029778 A2 | 4/2004 |

* cited by examiner

*Primary Examiner* — Sai-Ming Chan
(74) *Attorney, Agent, or Firm* — Meyertons, Hood, Kivlin, Kowert & Goetzel, P.C.

(57) ABSTRACT

A method for communicating additional network information using a synchronization identifier is presented. A synchronization identifier is defined. The synchronization identifier is used for the purpose of synchronizing communication between a Mobile Station (MS) and a network. In addition, the synchronization identifier is used to define additional functionality in the wireless network. As such, the synchronization identifier may be used to communicate information about wireless services and/or wireless components between the MS and the network.

14 Claims, 8 Drawing Sheets

METHOD FOR UPDATING AND MANAGING SYNCHRONIZATION IDENTIFIER BY USING RELEASE MESSAGES OR STATUS REQUEST AND RESPONSE

CROSS REFERENCE TO RELATED APPLICATIONS

This application claims priority from application Ser. No. 60/485,864 entitled "METHOD AND APPARATUS FOR UPDATING AND MANAGING SYNCHRONIZATION IDENTIFIER BY USING RELEASE MESSAGES OR STATUS REQUEST AND RESPONSE" filed on Jul. 9, 2003, the contents of which are incorporated herein by reference.

FIELD OF THE INVENTION

This invention relates to communication networks. Specifically, the present invention relates to wireless communication networks.

DESCRIPTION OF THE PRIOR ART

In a conventional wireless network, a Mobile Station (MS) may be used by an end user to access network services. The MS includes interface equipment used to terminate a wireless signal at the end-user side of a communication link. Examples of an MS include a cellular telephone, a wireless laptop, etc.

The MS communicates with a Base Station System (BS). The BS performs radio-related functions. The BS includes Base Transceiver Stations (BTSs) and a Base Station Controller (BSC). The BTS provides an interface to the MS. In one embodiment, the BTS includes radio equipment, such as the transceivers and antennas, needed to service each cell in a wireless network. Several BTSs are typically controlled by a BSC. The BSC provides control functions and physical links between a Message Switching Center (MSC) and the BTS. The MSC provides an interface to network functionality, such as an internal network, virtual private networks, public service telephone networks, etc.

During operation, configuration information is communicated between the MS and BS to facilitate communications. The configuration information is synchronized between the MS and the BS for proper operation of the system. One specific type of synchronization information is Sync_ID information (i.e., Sync_ID) as defined by TIA/EIA IS-2000.5-C, Signaling Standards for cdma2000 Spread Spectrum Systems—Release C, May 2002. The Sync_ID information is communicated between the MS and the BS in standardized messages to ensure that configuration information is current and updated between the MS and the BS.

With the tremendous increase in wireless technology, bandwidth is at a premium in most wireless systems. Therefore, a number of techniques have been developed to increase bandwidth. However, many of these techniques focus on developing hardware and software that increases speed and processing power. However, the development cost and additional complexity associated with developing hardware and software is often prohibitive.

Thus, there is a need for a method and apparatus for increasing performance and functionality of wireless networks within the context of the current signaling and message structure of standardized protocols. There is a need for a method and apparatus that utilizes the Sync_ID information to increase performance and functionality of wireless networks within the framework of various wireless standard.

SUMMARY OF THE INVENTION

The present invention is directed to a method and apparatus for increasing performance and functionality of wireless networks that utilize standardized messages. In one embodiment, additional network functions are implemented in a wireless network by utilizing synchronization information, such as the Sync_ID information (i.e., Sync_ID) defined in TIA/EIA IS-2000.5-C, Signaling Standards for cdma2000 Spread Sprectrum Systems—Release C, May 2002.

In one embodiment, additional meaning is associated with synchronization information, such as Sync_IDs, by mapping and/or correlating the synchronization information to additional information. Standardized messages are then used to communicate the synchronization information between the MS and the BS. For example, additional meaning is attributed to the synchronization information. As such, the synchronization information may be used to facilitate the synchronization of the MS and the BS and the same synchronization information may also be used to communicate additional information between the MS and the BS to provide additional functionality in the wireless system.

Additional network functions may be implemented using synchronization information. In one embodiment, the synchronization information may be used to define and/or communicate information about network services and/or network components. As a result, in addition to performing the primary function of synchronizing configuration information between the MS and the network, the synchronization information may also be used to communicate additional information, such as information about network services and/or network components. The additional information is then interpreted and used to implement additional network functions. As a result, the synchronization information is used to add functionality to the wireless system.

In one embodiment, the synchronization information is mapped to network services. For example, specific synchronization information may be used to represent a web browsing service. As such, when the synchronization information is communicated between the MS and the BS, information about the web browsing service is communicated between the MS and the BS.

In another embodiment, the synchronization information may be mapped to network components. As such, when the synchronization information is communicated between the MS and the BS, information about the network components is communicated between the MS and the BS. For example, information on whether a component exists in the network may be communicated using the synchronization information; information identifying a specific gateway that should be used to provide a better quality of service may be communicated using the synchronization information, etc.

Using the synchronization information to communicate information about network services and/or network components enables the implementation of additional network functions. As such, in accordance with the teachings of the present invention, the synchronization information is used to provide additional functionality in the wireless network. It should be appreciated that although specific network functions are defined and described, a variety of additional network functions may be defined and described using the synchronization information.

In accordance with the teachings of the present invention, a method of operating comprises the steps of receiving synchronization information using network messaging, the synchronization information capable of use for synchronization;

and then implementing a network function other than synchronization by interpreting the synchronization information.

A method for managing a synchronization identifier, comprises embedding a first synchronization identifier in a release order; transmitting the release order; and causing update of a second synchronization identifier using the first synchronization identifier received in the release order.

A method for managing a synchronization identifier, comprises formatting a status request at a base station for checking a mobile station synchronization identifier; transmitting the status request to a mobile station, the status request causing the mobile station to transmit a status response that includes the mobile station synchronization identifier; receiving the status response; and if the mobile station synchronization identifier does not match the base station synchronization identifier, transmitting an update request to the mobile station that includes the base station synchronization identifier.

DESCRIPTION OF THE INVENTION

Figure 1:
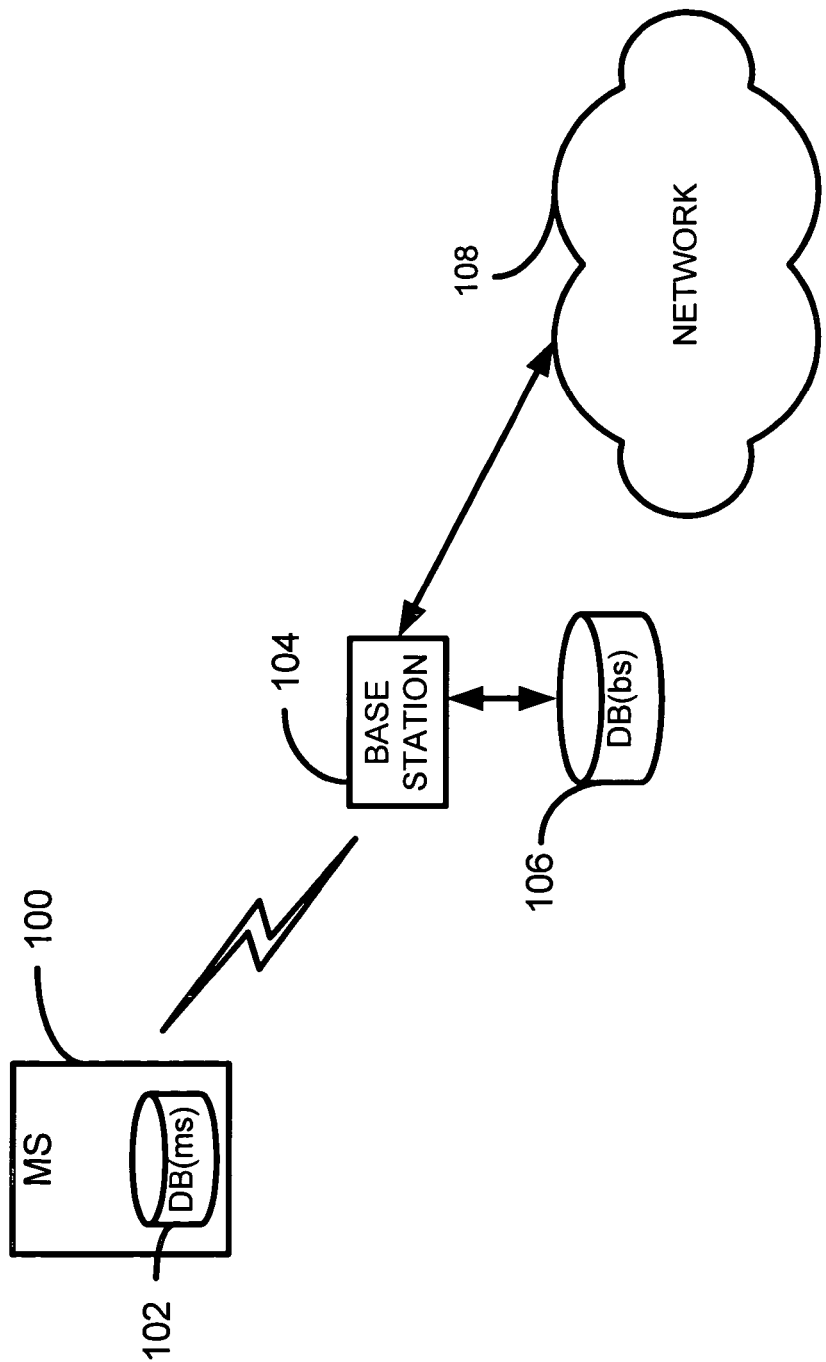
FIG. 1 displays a network implementing the teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It should be appreciated that although the present invention will be described with respect to TIA/EIA IS-2000.5-C, Signaling Standards for cdma2000 Spread Sprectrum Systems—Release C, May 2002, it is fully anticipated that this standard will evolve and that the evolved standards are within the scope of the present invention. Further, is should also be appreciated that the underlying teachings of the present invention are applicable to various other standards associated with the evolved standards.

A variety of terms defined in TIA/EIA IS-2000.5-C, Signaling Standards for cdma2000 Spread Sprectrum Systems—Release C, May 2002 will be used in the present invention. BS is used to represent a base station. MS is used to represent a mobile station. Various types of configuration information are defined. For example, NNSCR is a non-negotiable service configuration information record. The NNSCR contains non-negotiable service configuration parameters of a call. The ERM is an Extended Release Message. One type of synchronization information is the Service Configuration Information Record or SCR. The SCR contains the service configuration parameters of a call. Synchronization information includes the Sync_ID, which is a Service Configuration Synchronization Identifier. The Sync_ID is a variable length identifier corresponding to the SCR and NNSCR that may be stored by the base station and/or the mobile station. In one embodiment, the Sync_ID value is used by the base station to determine whether SCR and NNSCR may be omitted during the call set up.

In accordance with the teachings of the present invention, synchronization information is communicated using standardized network messaging. The synchronization information is then used (1) for the purpose of synchronizing components in the network and (2) for adding additional network functions (i.e., additional network functionality) to the network. In one embodiment of the present invention, the standardized network messaging includes standardized messages defined by communications protocols. For example, protocols defined by the $3^{rd}$ generation partnership project (i.e., 3GPP2), such as the 3G wireless protocol, protocols defined by the Internet Engineering Task Force (i.e., IETF), such as various internet protocols, etc. It should be appreciated that although two specific standards groups and family of protocols are discussed, the present invention applies to a variety of standards-based groups and communications protocols and messaging defined by the standards-based groups.

In one embodiment, the standardized messaging defined in TIA/EIA IS-2000.5-C, Signaling Standards for cdma2000 Spread Sprectrum Systems—Release C, May 2002 is used to implement the present invention. For example, in one embodiment, Release Order Messages as defined in TIA/EIA IS-2000.5-C, Signaling Standards for cdma2000 Spread Sprectrum Systems—Release C, May 2002 are used to communicate the synchronization information. In another embodiment, a Universal Handoff Messaging as defined in TIA/EIA IS-2000.5-C, Signaling Standards for cdma2000 Spread Sprectrum Systems—Release C, May 2002 is used to communicate the synchronization information.

The synchronization information is then used to add additional functions (i.e., functionality) to the network. In one embodiment, additional functionality includes a scenario in which the synchronization information is used to implement another function in addition to synchronization. For example, the synchronization information may be used to implement an additional service in the wireless network, such as video services, wireless services, Internet services, etc. Further, the synchronization information may be used to identify a component or network in the wireless network, such as a gateway, router, bridge, etc. For example, identifying various devices for communication may enable the network to implement functions, such as quality of service or load balancing, by routing traffic through various components in the wireless network.

In one embodiment, the additional function is implemented by mapping or correlating the synchronization information with values, numbers, symbols, etc. that have a predefined meaning and/or values, numbers, symbols that may be used to implement a predefined function. For example, in one embodiment, databases may be deployed in an MS and placed in association (i.e., in communication) with a BS. When synchronization information is communicated between the MS and the BS the synchronization information may be used to synchronize the two devices.

In addition, the synchronization information may be used as an index to map or correlate a value, number, symbol, etc. found in one or both of the databases. The value may be used to represent a service and/or component in the network. For example, the value may represent a video service or a router in the network. In the case where the value represents a video service, communicating the synchronization information between the MS and the BS provides information about the video service and, as such, facilitates the implementation of the video service in the network. In this scenario, the synchronization information is used to implement an additional network function or to add additional functionality in the network. In this example, the additional network function or functionality is the video service.

In the case where the value represents a device, such as a router in the network, communicating the synchronization information between the MS and the BS provides information that identifies the router and, as such, facilitates the use of the router in the network. As such, the synchronization information has been used to implement an additional function in the network or to add additional functionality in the network. The additional function or functionality is the identification of a specific device, such as the router that should be used for communication. As a result, functionality, such as load balancing and quality of service, may be realized by identifying which device to use to communicate traffic at a specific time.

FIG. 1 displays a network implementing the teachings of the present invention. A mobile station (MS) 100 is in communication with a base station (BS) 104. The MS 100 and the BS 104 synchronize information, such as a Sync_ID. The BS 104 may communicate with a network 108.

In one embodiment, the MS 100 includes or is in communication with a database (ms) 102. The database (ms) 102 may store synchronize information. For example, several Sync_IDs may be simultaneously stored in the database (ms) 102. The BS 104 also communicates with a database (bs) 106. The database (bs) 106 may also store various types of synchronization information, such as one or several Sync_IDs. It should be appreciated that although the database (bs) 106 is shown communicating with the BS 104, the database (bs) 106 may communicate across a network, such as network 108 with the BS 104.

In one embodiment, each database, database (ms) 102 and the database (bs) 106 may be used to implement additional network functions in the wireless network by mapping or correlating the synchronize information to a number, value, symbol, code, etc. that represents a component and/or service in the wireless network. For example, the database (ms) 102 and the database (bs) 106 may each be implemented as a relational database and perform a mapping or correlation between the synchronize information and a value representing a wireless service, such as an Internet service, wireless video, wireless audio, etc. As such, in addition to synchronizing configuration information between the MS 100 and the network 108 (i.e., BS 104), the synchronize information may be used to provide additional functionality to the wireless network by communicating information about network services.

In an alternative embodiment, the synchronization information may be used to implement a number, symbol, etc. that performs a mapping and/or correlation between the synchronization information and a component in the network, such as the MSC, a specific router, a specific end device. As such, the synchronization information may be used to implement, initiate, or communicate information about a specific device in the network. The device may then be used to distribute traffic. For example, load balancing may be achieved using the synchronization information. As such, in addition to synchronizing configuration information between the MS 100 and the network 108 (i.e., base station 104), the synchronization information is used to provide additional functionality in the wireless network by communicating information about network components.

During operation, synchronization information is communicated between the MS 100 and the BS 104. In one embodiment, the synchronization information may be used to represent configuration information, such as SCR and NNSCR. However, various types of configuration information may be represented and still remain within the scope of the present invention.

In accordance with the teachings of the present invention, standardized messages as defined in TIA/EIA IS-2000.5-C, Signaling Standards for cdma2000 Spread Sprectrum Systems—Release C, May 2002 and associated specifications may be used to communicate the synchronization information between MS 100 and BS 104. For example, in one embodiment, Release Order Messages as defined in TIA/EIA IS-2000.5-C, Signaling Standards for cdma2000 Spread Spectrum Systems—Release C, May 2002 and associated specifications may be used to communicate the synchronization information between MS 100 and BS 104. For example, the release messages, such as the Release Order Message, the Extended Release Message and/or the Extended Release Mini-Message, etc., may be implemented.

In another embodiment, Handoff Messages as defined in TIA/EIA IS-2000.5-C, Signaling Standards for cdma2000 Spread Sprectrum Systems—Release C, May 2002 and associated specifications may be used to communicate the synchronization information between MS 100 and BS 104. In one embodiment, Handoff Messages as defined in TIA/EIA IS-2000.5-C, Signaling Standards for cdma2000 Spread Sprectrum Systems—Release C, May 2002 and associated specifications, such as a Universal Handoff Direction Message, may be implemented.

Once the synchronization information is communicated between the MS 100 and the BS 104, the configurations between the MS 100 and the BS 104 may be synchronized. In addition, in accordance with the teachings of the present invention, the synchronization information may be used to provide additional functionality to the wireless network depicted in FIG. 1. For example, in one embodiment, the synchronization information may be used as an index to search database (ms) 102 and/or database (bs) 106. The synchronization information may map or correlate with a value, symbol, number, etc. representing a service, component, etc. in a network. As such, by communicating the synchronization information and then storing, searching, mapping, correlating, and/or using the synchronization information in association with the database (ms) 102 and the database (bs) 106, additional network information about network components and/or services are communicated with the synchronization information. Additional network information may include information used to implement additional functions in the network, such as information used to implement additional network services, information used to identify specific components or networks, information used to launch automated routines in the MS 100 or BS 104, information used to automatically configure network 108, etc.

In one embodiment of the present invention, the synchronization information is used to implement fast call setup related features. For example, the BS 104 assigns synchronization information representing the configurations (i.e., Sync_ID which represents SCR and NNSCR) that are associated with service option(s) associated with the MS 100 (i.e., based on end user subscription policy, criteria, etc.). When either side (i.e., BS 104 and/or MS 100) connects a call using these service options, the BS 104 or the MS 100 can use the synchronization information to identify the stored configurations for the call. For example, in one embodiment, packet data service (i.e., web browsing) can use the synchronization information when the service is connected and disconnected between an idle state and a traffic state.

In addition to the configuration information, such as the SCR and the NNSCR that the synchronization information is used to represent, in accordance with the teachings of the present invention, the synchronization information itself can carry additional useful information and, as such, provide additional functionality in the wireless system. For example, various types of Internet protocol information, such as the MS's Internet protocol version 4 (i.e., IPv4) address and/or the Generic Routing Encapsulation (GRE) Key information for the packet data service option of the MS, may be communicated using the synchronization information. As such, the BS 104 may use the synchronization information itself during the service option reconnection to speed up the connection or for other purposes.

In one embodiment, synchronization information includes a base station synchronization identifier (BSSI) and a mobile station synchronization identifier (MSSI). In one embodiment, the BSSI may be used to communicate the current configuration status of the BS 104. The MSSI is synchronization information that is used to convey the current synchronization status of the MS 100.

During operation, the BS 104 may communicate the BSSI to the MS 100 and the MS 100 may communicate the MSSI to the BS 104. For example, using FIG. 1 BS 104 may communicate the BSSI to the MS 100. The MS 100 may then optionally store the MSSI in the database (ms) 102. In addition, the MS 100 may communicate the MSSI to the BS 104. The BS 104 may then optionally store the BSSI in the database (bs) 106.

In accordance with the teachings of the present invention, the BS 104 may embed the BSSI in a standardized communication message. For example, in one embodiment, the BS 104 may embed the BSSI in a Release Order Message, such as the Release Order Messages as defined in TIA/EIA IS-2000.5-C, Signaling Standards for cdma2000 Spread Sprectrum Systems—Release C, May 2002 and associated specifications. In one embodiment, the Release Messages include the Release Order Message, the Extended Release Message, and/or the Extended Release Mini-Message.

The BS 104 may then transmit the Release Message to the MS 100. The MS 100 receives the Release Message communicated by the BS 104 and is then able to update the MSSI using the BSSI embedded in the Release Message. In another embodiment, the MS 100 may then transmit the Release Message to the BS 104. The BS 104 receives the Release Message communicated by the MS 100. The BS 104 may embed a BSSI in a Release Message. The BS 104 may then transmit the Release Message to the MS 100. The MS 100 receives the Release Message communicated by the BS 104 and is then able to update the MSSI using the BSSI embedded in the Release Message.

It should be appreciated that the foregoing method may be implemented while the MS 100 and the BS 104 are operating on the traffic channel or in the idle state. In addition, the BSSI may be used to communicate additional information used to implement network functions. For example, in one embodiment, the BSSI is used to communicate additional service information, such as mobile IP information or GRE tunnel information. In another embodiment, the BSSI may be used to communicate additional network component information, such as a specific device to use during the communication session. Lastly, it should be appreciated that the Release Message may include multiple instances of synchronization information, such as multiple BSSIs or multiple MSSIs.

In another embodiment of the present invention, during operation a status request is formulated at the BS 104. The status request is formulated to check the current MSSI in the MS 100. The status request is transmitted from the BS 104 to the MS 100. After receiving the status request at the MS 100, a status response is formulated by the MS 100. The status response includes the MSSI associated with the MS 100. The status response is transmitted to the BS 104. The BS 104 then checks to determine if the MSSI transmitted by the MS 100 matches the current MSSI stored in association with the BS 104. If the MSSI does not match the current BSSI, then an update request including the current MSSI is transmitted from the BS 104 to the MS 100.

Figure 2:
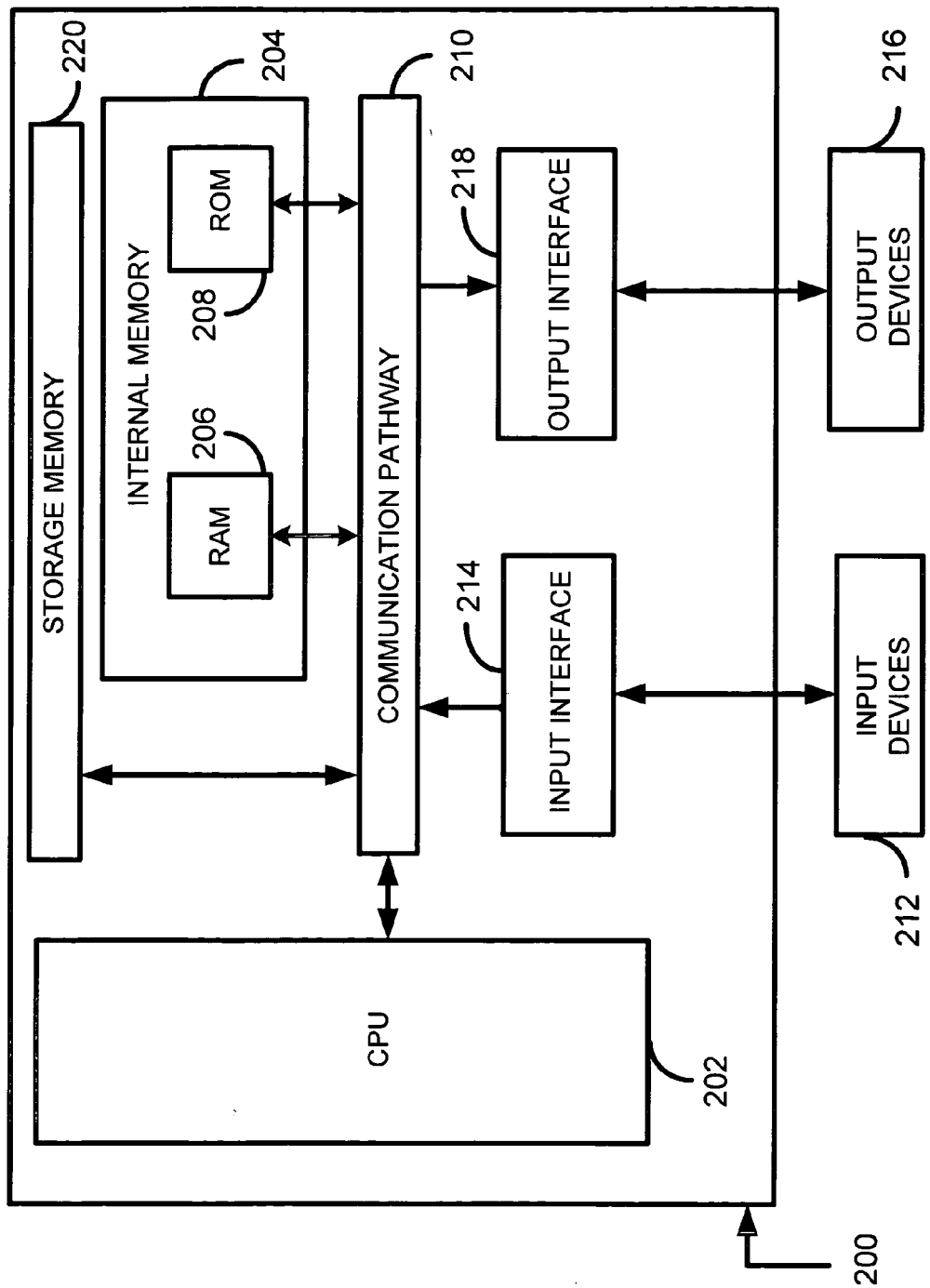
FIG. 2 displays a computer architecture implementing the teachings of the present invention.

FIG. 2 displays a computer architecture implementing the teachings of the present invention. The computer 200 of FIG. 2 may implement the mobile station (MS) 100, the database (ms) 102, the base station (BS) 104, the database (bs) 106, and the network 108 of FIG. 1. A central processing unit (CPU) 202 functions as the brain of the computer 200. Internal memory 204 is shown. The internal memory 204 includes short-term memory 206 and long-term memory 208. The short-term memory 206 may be a Random Access Memory (RAM) or a memory cache used for staging information. The long-term memory 208 may be a Read Only Memory (ROM) or an alternative form of memory used for storing information. Storage memory 220 may be any memory residing within the computer 200 other than internal memory 204. In one embodiment of the present invention, storage memory 220 is implemented with a hard drive. A communication pathway 210 is used to communicate information within computer 200. In addition, the communication pathway 210 may be connected to interfaces, which communicate information out of the computer 200 or receive information into the computer 200.

Input devices, such as tactile input device, joystick, keyboards, microphone, communications connections, or a mouse, are shown as 212. The input devices 212 interface with computer 200 through an input interface 214. Output devices, such as a monitor, speakers, communications connections, etc., are shown as 216. The output devices 216 communicate with computer 200 through an output interface 218.

Figure 3:
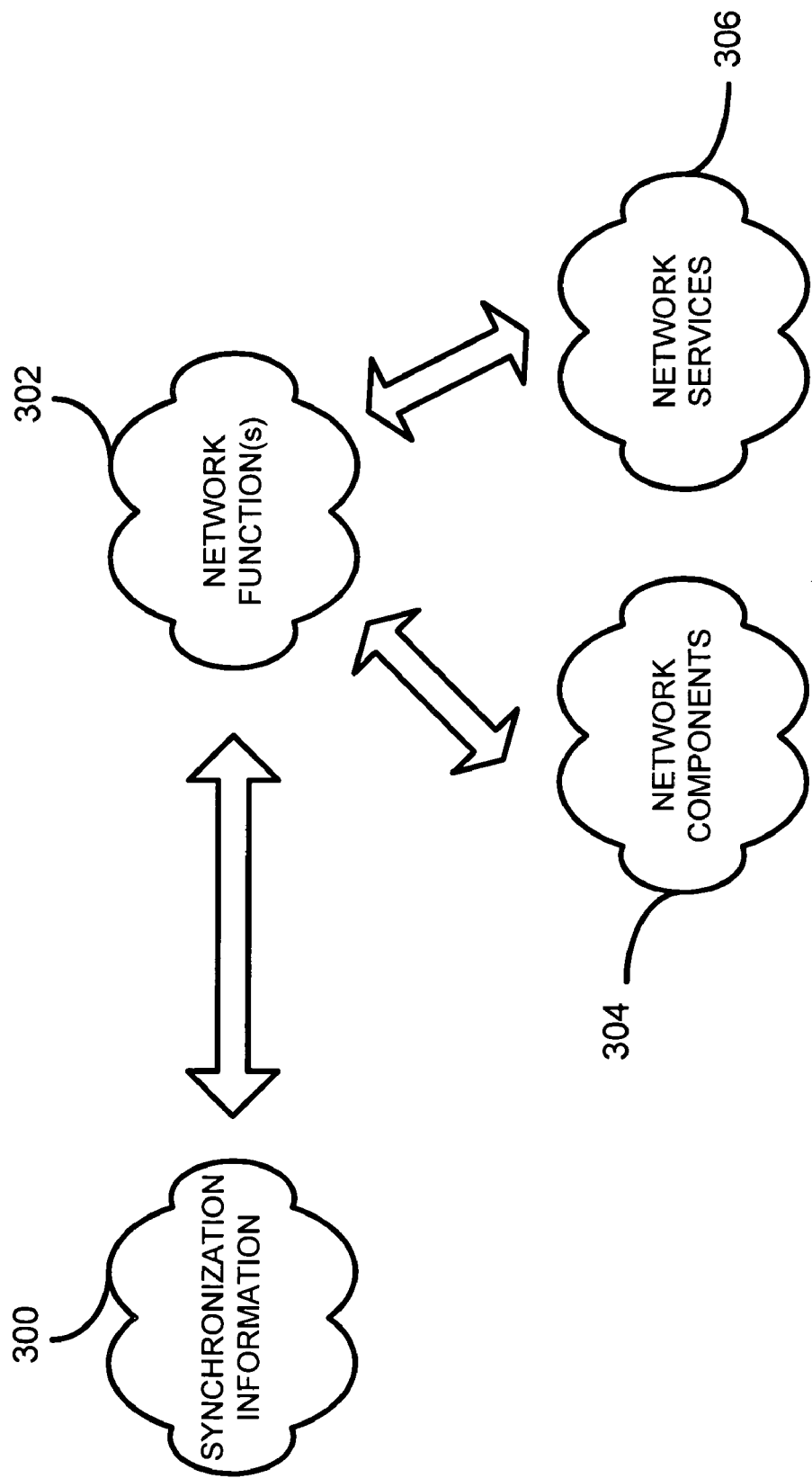
FIG. 3 displays a data diagram displaying the mapping between the synchronization information and different of network functions.

FIG. 3 depicts a data diagram displaying a mapping between the synchronization information and different network functions. The synchronization information 300 is mapped to various network functions 302 (i.e., functionality). For example, the synchronization information is mapped to network components 304. In one embodiment, the network components 304 may include an MSC, routers, base stations, MS, etc. When the synchronization is mapped to a network component as shown at 304, information about a specific network component may be communicated between the BS and the MS during synchronization using the synchronization information. As such, routing, load balancing, etc. may be implemented using the synchronization information.

In a second embodiment, network services 306 may be communicated, initiated, and implemented using the synchronization information. For example, network services, such as Internet services, web services, maintenance services, audio services, video services, etc., may be implemented using the synchronization information 300. As such, using the synchronization information provides another option for communicating information about services between the MS and the network.

Figure 4:
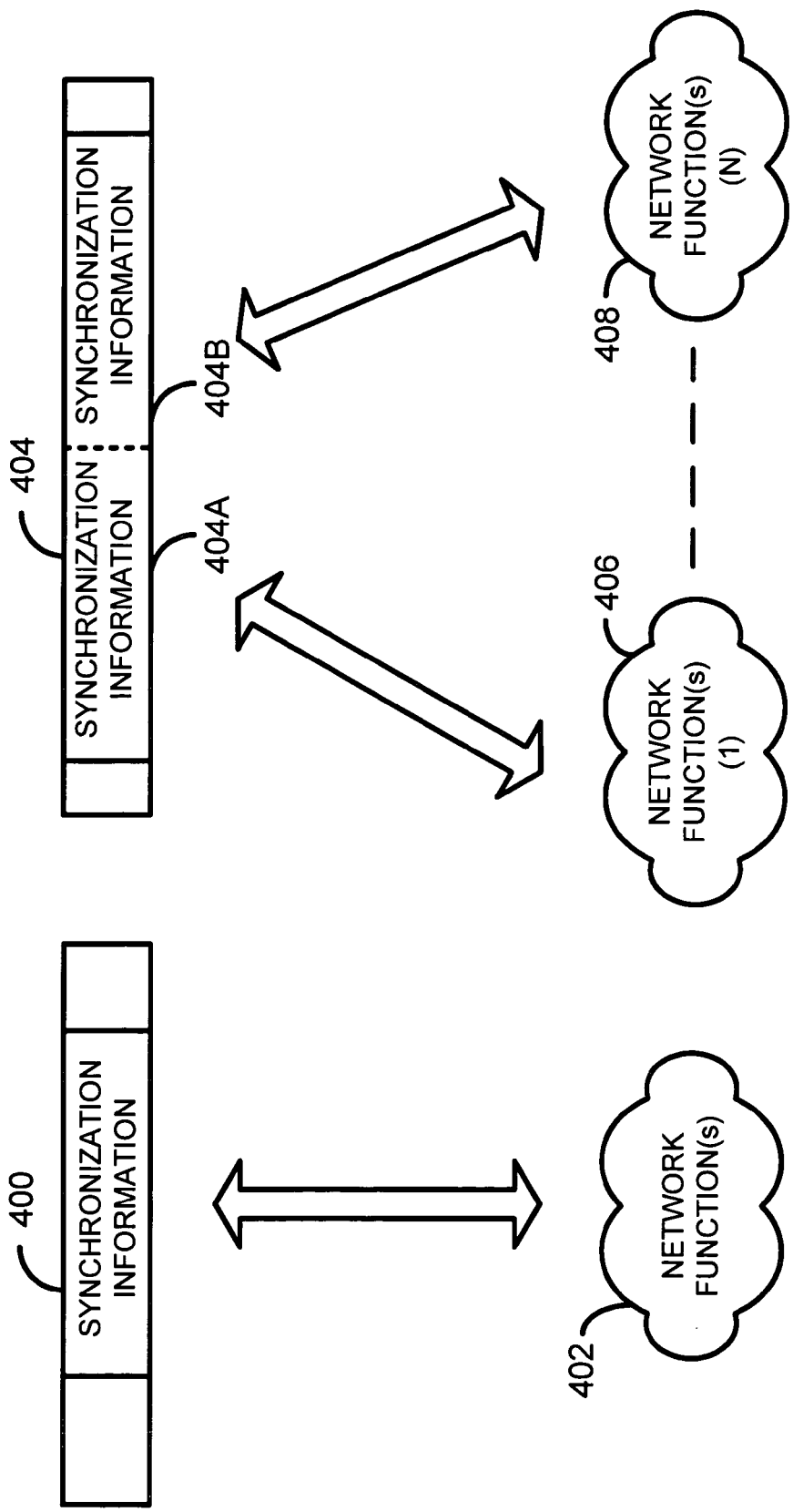
FIG. 4A displays a data diagram displaying the mapping between a packet including synchronization information and specific network functions.
FIG. 4B displays a data diagram displaying the mapping between a packet including a field including synchronization information and various network functions.

FIG. 4A displays a data diagram displaying the mapping between a packet including synchronization information and specific network functions. In FIG. 4A, a data packet including a field comprising synchronization information 400 is mapped to a network function(s) 402. In one embodiment, the field comprising synchronization information 400 is mapped to a specific network function, such as a network service, a network component, etc. For example, a one-to-one mapping is performed between the synchronization information 400 and specific network function.

FIG. 4B displays a data diagram displaying the mapping between a packet including a field including synchronization information and various network functions. In a second embodiment, a field comprising synchronization information 404 is mapped to several network functions as shown by 406 to 408. For example, one field comprising synchronization information 404 may be mapped to a network function(s) 406 to 408 where the network function(s) 406 to 408 may represent several network services or several network components. For example, in one embodiment, the field comprising synchronization information 404 may be segmented into several fields comprising synchronization information as shown by 404A or 404B. Each field comprising synchronization information, such as 404A and 404B may be linked to a specific network service.

In an alternative embodiment, synchronization information 404 may be used to implement a variety of different network functions. For example, a single instance of synchronization information may be used to represent multiple components or multiple services. In addition, any permutation or combination of the foregoing is within the scope of the present invention.

Figure 5:
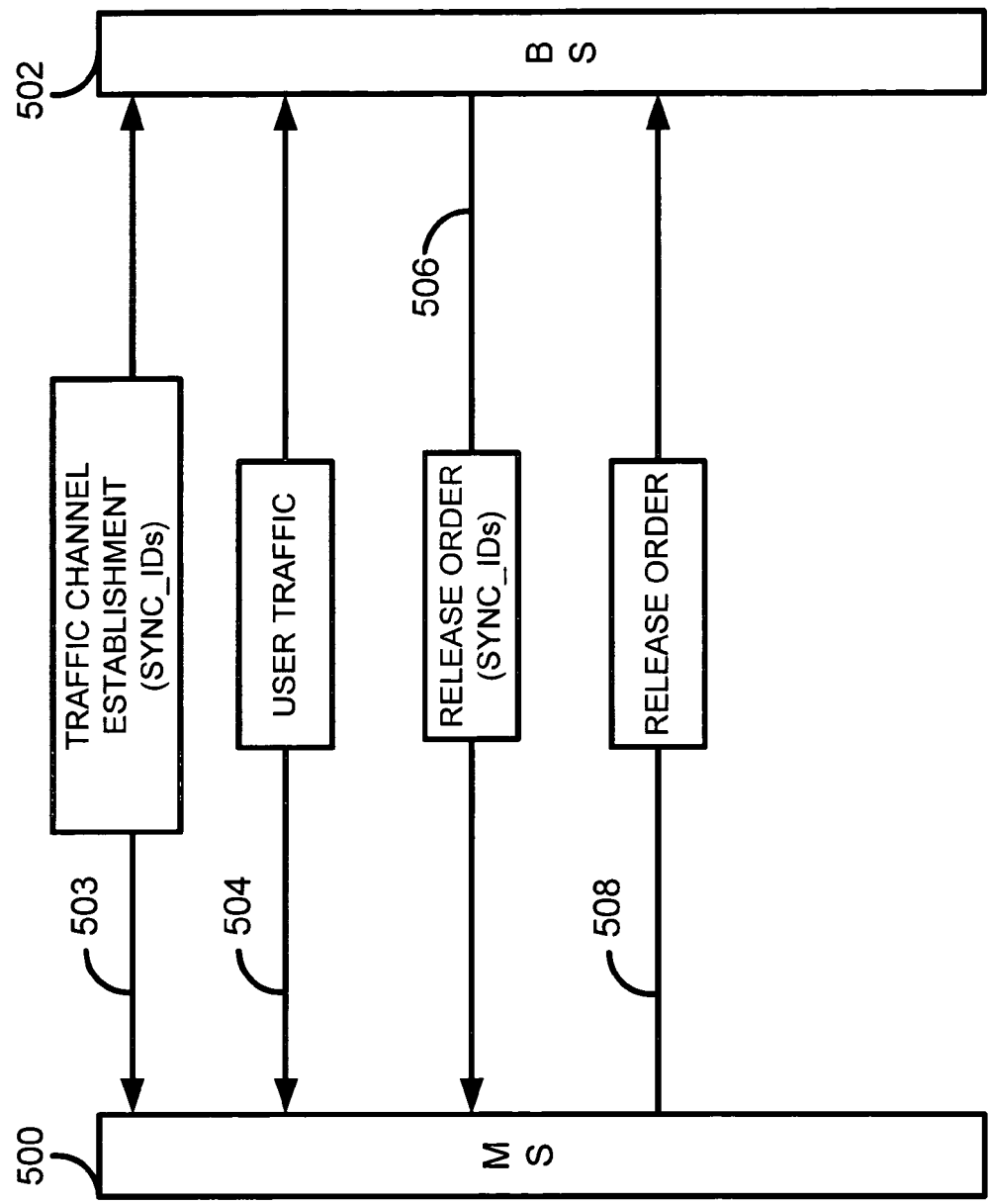
FIG. 5 displays a message flow diagram in which a BS updates Sync_ID with a Release Order Message.

FIG. 5 displays a message flow diagram in which a BS updates synchronization information using Release Order messaging. The traffic channel is already established and the mobile station has moved from a first cell to a second cell.

At 503 a traffic channel is established and synchronization information is communicated. An MS 500 and a BS 502 communicate synchronization information over traffic as shown by 504. The BS may then communicate a Release Order to the MS. The Release Order includes Sync_IDs as shown at 506. It should be appreciated that either the MS or the BS may initiate the Release Order. In one embodiment, if the MS initiates the Release Order, the BS may respond with Release Order including the synchronization information as shown at 506. In another embodiment, the base station initiates the Release Order including the synchronization information as shown at 506. The MS may then communicate a Release Order to the BS as shown at 508.

In another embodiment, upon release of a call, the BS 502 sends a Release Order, Extended Release Message, or Extended Release Mini-Message to update the current synchronization information in the MS 500. In accordance with the teachings of the present invention, in addition to communicating configuration related information on the SCR and NNSCR of the call, the synchronization information may convey additional information, such as mobile IP information and/or Generic Routing Encapsulation (GRE) Key information for a GRE tunnel.

Figure 6:
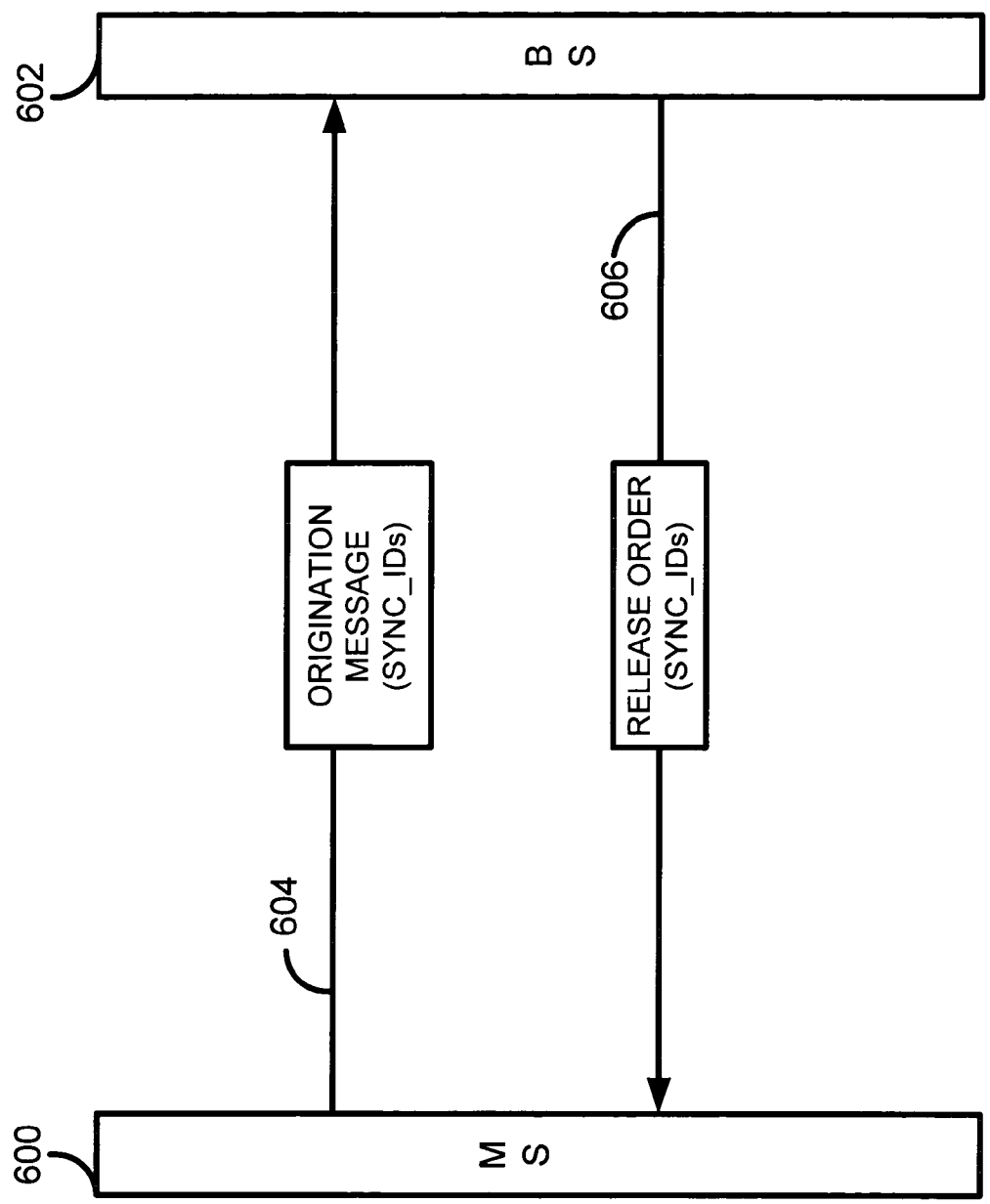
FIG. 6 displays a message flow diagram in which a BS updates a Sync_ID with a Release Order on Common Channel.

FIG. 6 displays a message flow diagram in which a BS updates synchronization information with a Release Order on a Common Channel. In one embodiment, the message flow diagram depicted in FIG. 6 occurs in an idle state. An MS 600 communicates an origination message including synchronization information (i.e., Sync_IDs) 604 to a BS 602. The BS 602 then communicates a Release Order including synchronization information 606 to the MS 600. In another embodiment, the BS 602 may also use the Release Order while in a Mobile Station Idle State to update the synchronization information stored in the MS 600. This is especially useful when the MS 600 updates its packet data zone information while in Idle.

Figure 7A:
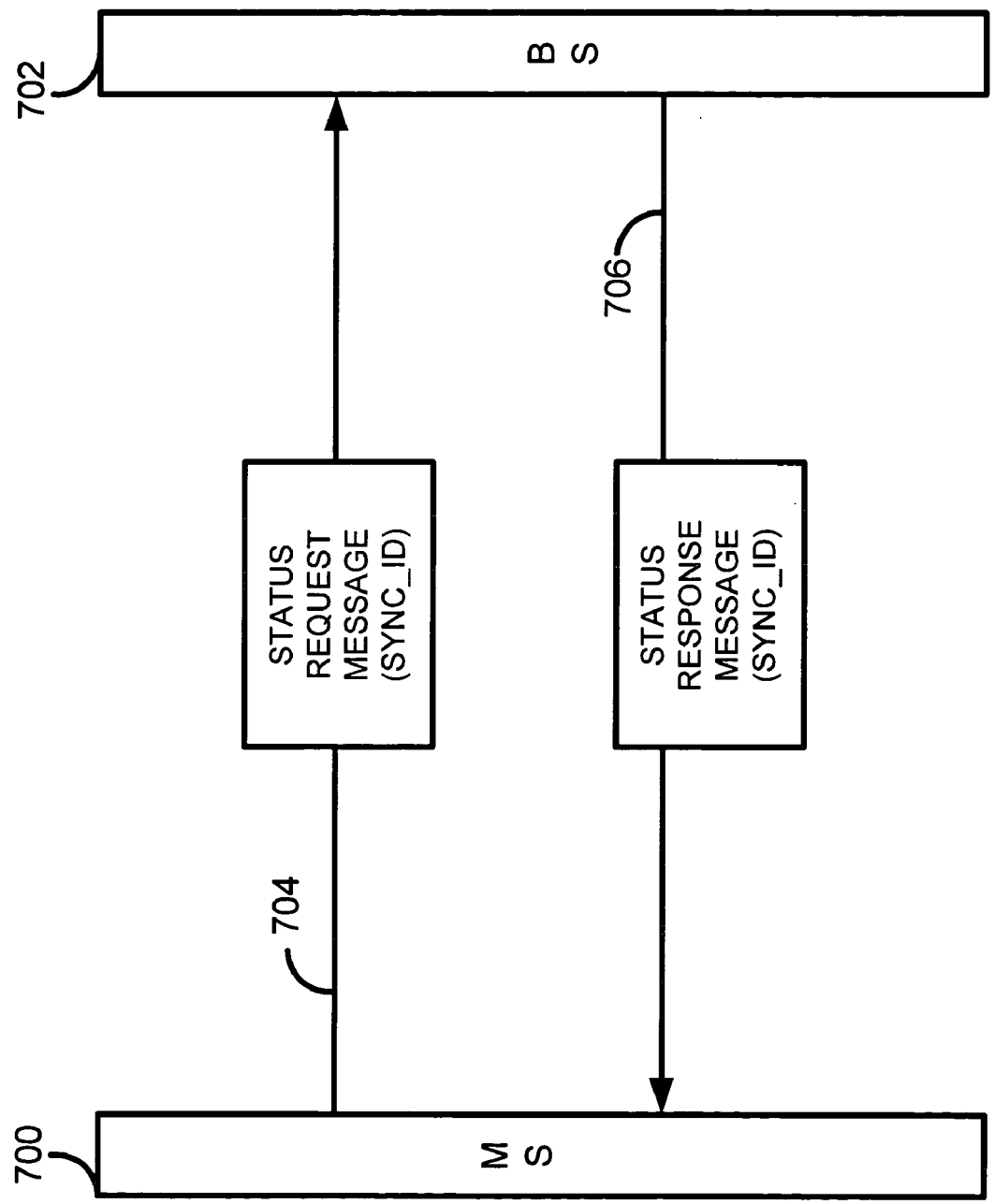
FIG. 7A displays a message flow diagram in which the MS performs a query.

FIG. 7A displays a message flow diagram in which the MS performs a query. An MS 700 generates a Status Request Message including synchronization information 704 and communicates the Status Request Messaging including synchronization information 704 to the BS 702. The BS 702 then generates a Status Response Message including synchronization information 706 to the MS 700.

Since the BS 702 can store multiple instances of synchronization information, there is a chance that the synchronization information stored in the MS 700 and BS 702 may not be synchronized. In accordance with the teachings of the present invention, we propose to allow a MS 700 to query (i.e., in CDMA, use Status Request Message, or other messages that have the query capability) the synchronization information stored in the BS 702 either in BS 702 Idle State or in traffic mode (i.e., mobile station can use Status Response Message or other messages that have the ability to report the stored Sync_ID).

Figure 7B:
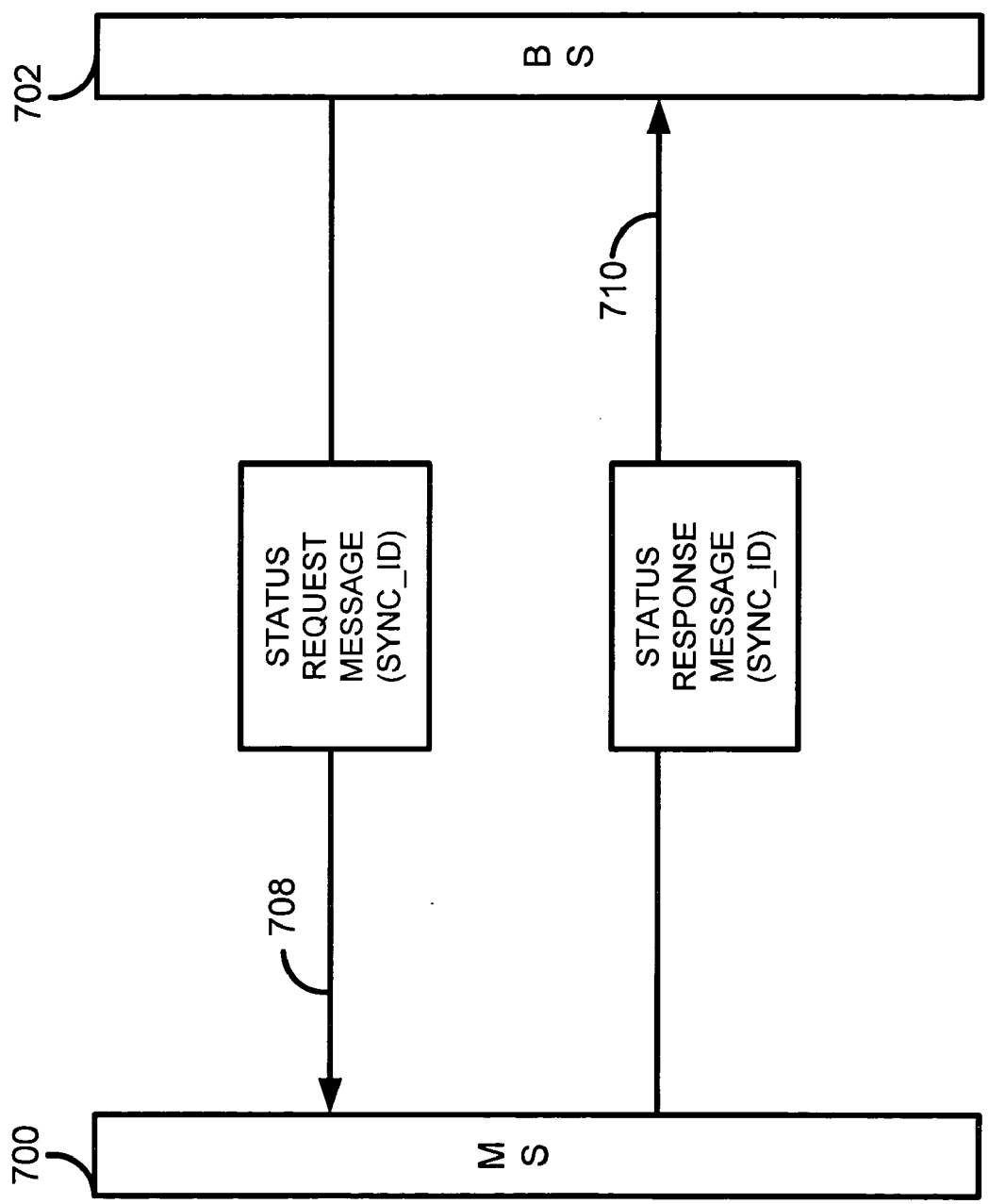
FIG. 7B displays a message flow diagram in which the BS performs a query.

FIG. 7B displays a message flow diagram in which the BS performs a query. A BS 702 generates a Status Request Message including synchronization information 708 and communicates the Status Request Messaging including synchronization information 708 to the MS 700. The MS 700 then generates a Status Response Message including synchronization information 710 to the BS 702.

Since the MS 700 can store multiple instances of synchronization information, there is a chance that the synchronization information stored in the MS 700 and BS 702 may not be synchronized. In accordance with the teachings of the present invention, we propose to allow an BS 702 to query (i.e., in CDMA, use Status Request Message, or other messages that have the query capability) the synchronization information stored in the MS 700 either in MS 700 Idle State or in traffic mode (i.e., mobile station can use Status Response Message or other messages that have the ability to report the stored Sync_ID).

The synchronization information is used to communicate additional information between the MS 700 and the BS 702, such as information identifying services or components in the wireless network. In addition, the synchronization information is communicated between the MS 700 and the BS 702 using a variety of different mechanisms. For example, the synchronization information is communicated using Release Order Messages or Handoff Messages.

The following text identifies specific sections of the TIA/EIA IS-2000.5-C, Signaling Standards for cdma2000 Spread Sprectrum Systems—Release C, May 2002, which is herein incorporated by reference that may be updated to implement the teachings of the present invention. It should also be appreciated that implementing the teachings of the present invention using the Extended Release Message or Extended Release Mini-Message as defined in TIA/EIA IS-2000.5-C, Signaling Standards for cdma2000 Spread Sprectrum Systems—Release C, May 2002 are similar to the methods disclosed when using the Release Order Message. It should be appreciated that the following text discloses the teachings of the present invention using a single Sync_ID in the Release Order. In another embodiment, multiple Sync_IDs may be included in the Release Order by including an extra field to indicate the number of Sync_IDs included in the message, by sub-dividing the current Sync_ID field, etc.

2.6.3.3 Page Response Substate

In this substate, the mobile station sends a Page Response Message or a Reconnect Message in response to a mobilestation-addressed page from a base station. If the mobile station sends a Reconnect Message, it shall set the ORIG_IND field of the message to '0'.

[ . . . ]

14. Release Order: If NDSS_ORIG$_s$ is equal to enabled, the mobile station shall set NDSS_ORIG$_s$ to disabled, and should indicate to the user that the call origination has been canceled. The mobile station shall enter the Mobile Station Idle State or the System Determination Substate of the Mobile Station Initialization State with a release indication (see 2.6.1.1). If the mobile station enters the Mobile Station Idle State, and if PACA$_s$ is equal to enabled, the mobile station shall set PACA$_s$ to disabled and PACA_CANCEL to '0', shall disable the PACA state timer, and should indicate to the user that the PACA call has been canceled. If P_REV_IN_USE$_s$ is equal to or greater than eleven, ORDQ is equal to '00000000', and SYNC_ID_INCL$_r$ is equal to '1', the mobile station shall update the synchronization identifier received from the base station corresponding to the current service configuration (SYNC_ID$_s$=SYNC_ID$_r$).

[ . . . ]

2.6.3.5 Mobile Station Origination Attempt Substate

In this substate, the mobile station sends an Origination Message or a Reconnect Message. If the mobile station sends a Reconnect Message, it shall set the ORIG_IND field of the message to '1'.

The mobile station shall not send the Reconnect Message if RECONNECT_MSG_IND$_s$ equals '0' or if this message is not being sent to reconnect a dormant packet data service instance.

[ . . . ]

16. Release Order: If NDSS_ORIG$_s$ is equal to enabled, the mobile station shall set NDSS_ORIG$_s$ to disabled, and should indicate to the user that the call origination has been canceled. The mobile station shall enter the Mobile Station Idle State or the System Determination Substate of the Mobile Station Initialization State with a release indication (see 2.6.1.1). If the mobile station enters the Mobile Station Idle State, and if PACA$_s$ is equal to enabled, the mobile station shall set PACA$_s$ to disabled and PACA_CANCEL to '0', shall disable the PACA state timer, and should indicate to the user that the PACA call has been canceled. If P_REV_IN_USE$_s$ is equal to or greater than eleven, ORDQ is equal to '00000000', and SYNC_ID_INCL$_r$ is equal to '1', the mobile station shall update the synchronization identifier received from the base station corresponding to the current service configuration (SYNC_ID$_s$=SYNC_ID$_r$).

2.6.3.6 Registration Access Substate

In this substate, the mobile station sends a Registration Message. If the base station responds with an authentication request, the mobile station responds in this substate.

[ . . . ]

13. Release Order: If NDSS_ORIG$_s$ is equal to enabled, the mobile station shall set NDSS_ORIG$_s$ to disabled, and should indicate to the user that the call origination has been canceled. The mobile station shall enter the Mobile Station Idle State or the System Determination Substate of the Mobile Station Initialization State with a release indication (see 2.6.1.1). If the mobile station enters the Mobile Station Idle State, and if PACA$_s$ is equal to enabled, the mobile station shall set PACA$_s$ to disabled and PACA_CANCEL to '0', shall disable the PACA state timer, and should indicate to the user that the PACA call has been canceled. If P_REV_IN_USE$_s$ is equal to or greater than eleven, ORDQ is equal to '00000000', and SYNC_ID_INCL$_r$ is equal to '1', the mobile station shall update the synchronization identifier received from the base station corresponding to the current service configuration (SYNC_ID$_s$=SYNC_ID$_r$).

[ . . . ]

2.6.4.3 Traffic Channel Substate

In this substate, the mobile station may exchange Traffic Channel frames with the base station in accordance with the current service configuration. The mobile station may perform the gating operation of Reverse Pilot Channel.

[ . . . ]

If the mobile station receives a message which is included in the following list and every message field value is within its permissible range, the mobile station shall process the message as described below and in accordance with the message's action time (see 2.6.4.1.5).

[ . . . ]

42. Release Order: The Layer 3 shall send a "release indication" to all Call Control instances, the mobile station shall perform the following:
If P_REV_IN_USE$_s$ is equal to or greater than eleven, ORDQ is equal to '00000000', and SYNC_ID_INCL$_r$ is equal to '1', the mobile station shall update the synchronization identifier received from the base station corresponding to the current service configuration (SYNC_ID$_s$=SYNC_ID$_r$).

The mobile station shall enter the Release Substate with a base station release indication (see 2.6.4.4).

[ . . . ]

2.6.4.4 Release Substate

In this substate, the mobile station confirms the disconnect of all calls and physical channels.

Upon entering the Release Substate, the mobile station shall perform the following:

[ . . . ]

If the mobile station enters the Release Substate with a service inactive indication, the mobile station shall send a Release Order (ORDQ='00000010'), and set RETURN_CAUSE$_s$ to '0000'.

If the mobile station enters the Release Substate with a base station release indication, the mobile station shall send a Release Order (ORDQ='00000000'). The Layer 3 shall terminate all Call Control instances. The mobile station shall disable its transmitter, set RETURN_CAUSE$_s$ to '0000', and shall perform the procedures as specified in 2.6.4.4.1.

[ . . . ]

If the mobile station receives a message which is included in the following list, and if every message field value is within its permissible range, the mobile station shall process the message as described below and in accordance with the message's action time (see 2.6.4.1.5):

[ . . . ]

24. Release Order: The mobile station shall disable its transmitter. The Layer 3 shall terminate all Call Control instances. The mobile station shall perform the following:
If P_REV_IN_USE$_s$ is equal to or greater than eleven, ORDQ is equal to '00000000', and SYNC_ID_INCL$_r$ is equal to '1', the mobile station shall update the synchronization identifier received from the base station corresponding to the current service configuration (SYNC_ID$_s$=SYNC_ID$_r$).

If the mobile station enters the Release Substate with a power-down indication, the mobile station may power down; otherwise, the mobile station shall perform the procedures as specified in 2.6.4.4.1

[ . . . ]

2.6.4.4.1 Procedures for Exiting the Release Substate

The mobile station shall perform the following procedures to determine whether to enter the Mobile Station Idle State or System Determination Substate of the Mobile Station Initialization State.

[...]

2.7.4 Information Records

On the r-csch, information records may be included in the Status Response Message, the Extended Status Response Message, the Origination Message, and the Device Information Message. On the r-dsch, information records may be included in the Origination Continuation Message, the Enhanced Origination Message, the Flash With Information Message, the Extended Flash With Information Message, the Service Request Message, the Service Response Message, the Status Message, and the Status Response Message. Table 2.7.4-1 lists the information record type values that may be used with each message type. The following sections describe the contents of each of the record types in detail.

[...]

TABLE 2.7.4-1

Information Record Types (Part 3 of 3)

| Information Record | Record Type (binary) | Message Type | r-csch | r-dsch | P_REV_IN_USE |
|---|---|---|---|---|---|
| Signaling Message Integrity Capability | 00100100 | Status [2] | Y | Y | ≧10 |
| STORED_SYNC_ID | 00100101 | Status [2] | Y | Y | ≧11 |
| Extended Record Type - International | 11111110 | Country-Specific | | | 1, ≧4 |

All other record type values are reserved.
"Flash" refers to either the Flash With Information Message or the Extended Flash With Information Message.
"DIM" refers to the Device Information Message.
[1] This information record may be included in a Status Message, a Status Response Message, or an Extended Status Response Message.
[2] This information record may be included in a Status Response Message or an Extended Status Response Message.

[...]

2.7.4.36 Stored SYNC_ID

This information record can be included in a Status Response Message or an Extended Status Response Message to return the mobile station stored SYNC_ID.

| Type-Specific Field | Length (bits) |
|---|---|
| NUM_SYNC_ID | 3 |
| NUM_SYNC_ID occurrences of the following two-field record: | |
| SYNC_ID_LEN | 0 or 4 |
| SYNC_ID | 0 or (8 × SYNC_ID_LEN) |

NUM_SYNC_ID—Number of Service Configuration synchronization identifier. The mobile station shall set this field to the number of Service Configuration synchronization identifier stored by the mobile station. The mobile station shall set this field to '000' if no SYNC_ID is stored.
SYNC_ID_LEN—Service Configuration synchronization identifier length. If the SYNC_ID_INCL field is set to '000', the base station shall omit this field; otherwise, the base station shall include this field and set it as follows: The base station shall set this field to the length (in octets) of the SYNC_ID field included in this message. The base station shall set this field to a value larger than zero.
SYNC_ID—Service Configuration synchronization identifier. If the SYNC_ID_INCL field is set to '000', the base station shall omit this field; otherwise, the base station shall include this field and set it as follows: The base station shall set this field to the synchronization identifier corresponding to the service configuration conveyed by this message.

3.7.2.3.2.15 Status Request Message
MSG_TAG: STRQM

| Field | Length (bits) |
|---|---|
| RESERVED | 4 |
| QUAL_INFO_TYPE | 8 |
| QUAL_INFO_LEN | 3 |
| Type-specific fields | 8 □ QUAL_INFO_LEN |
| NUM_FIELDS | 4 |
| NUM_FIELDS occurrences of the following field: | |
| RECORD_TYPE | 8 |

[...]

TABLE 3.7.2.3.2.15-2

Status Information Record Types

| Information Record Requested | Record Type (see Table 2.7.4-1) (binary) | QUAL_INFO_TYPE (binary) |
|---|---|---|
| Reserved for obsolete Identification | 00000110 | — |
| Call Mode | 00000111 | 00000000 |
| Terminal Information | 00001000 | 00000010 |
| Roaming Information | 00001001 | 00000010 |
| Security Status | 00001010 | 00000000 |
| IMSI | 00001100 | 00000000 |
| ESN | 00001101 | 00000000 |
| Band Class Information | 00001110 | 00000000 |
| Power Class Information | 00001111 | 00000010 |
| Operating Mode Information | 00010000 | 00000001 |
| Service Option Information | 00010001 | 00000010 |
| Multiplex Option Information | 00010010 | 00000010 |
| Service Configuration | 00010011 | 00000000 |
| Power Control Information | 00010111 | 00000000 |
| IMSI_M | 00011000 | 00000000 |
| IMSI_T | 00011001 | 00000000 |
| Capability Information | 00011010 | 00000000 |
| Channel Configuration | 00011011 | 00000000 |
| Capability Information | | |
| Extended Multiplex Option Information | 00011100 | 00000000 |
| Geo-location Information | 00011110 | 00000000 |
| Band Subclass Information | 00011111 | 00000001 |
| Hook Status | 00100001 | 00000000 |
| Encryption Capability | 00100011 | 00000000 |
| STORED_SYNC_ID | 00100101 | 00000000 |

All other record type values are reserved.

TABLE 3.7.4-1

Order and Order Qualification Codes Used on the f-csch and the f-dsch (Part 2 of 4)

| f-csch Order | f-dsch Order | Order Code, ORDER (binary) | Order Qualification Code, ORDQ (binary) | ACTION_TIME can be specified | Additional Fields other than ORDQ | P_REV_IN_USE | Name/Function |
|---|---|---|---|---|---|---|---|
| N | Y | 010011 | 00000000 | Y | Y | <7 | Service Option Request Order (Band Class 0 only) (see 3.7.4.2) |
| N | Y | 010100 | 00000000 | Y | Y | <7 | Service Option Response Order (Band Class 0 only; see 3.7.4.3) |
| Y | Y | 010101 | 00000000 | N | Y | All | Release Order (no reason given. See 3.7.4.10 for additional fields other than ORDQ if the P_REV_IN_USE ≧11.) |
| Y | Y | 010101 | 00000010 | N | N | All | Release Order (indicates that requested service option is rejected) |
| N | Y | 010101 | 00000011 | N | Y | ≧9 | Release Order (Enhanced Release Order to direct the mobile station to Mobile Station Idle State or System Determination Substate; see 3.7.4.8) |
| N | Y | 010110 | 00000000 | N | N | All | Outer Loop Report Request Order |

3.7.4.10 Release Order

If P_REV_IN_USE≧11, the Release Order with ORDQ='00000000' and additional field other than ORDQ can be sent on the either f-csch or f-dsch to update station's SYNC_ID if included.

| Order-Specific Field | Length (bits) |
|---|---|
| ORDQ | 8 |
| If the ORDQ is '00000000', the mobile station shall include the following order-specific record: | |
| SYNC_ID_INCL | 1 |
| SYNC_ID_LEN | 0 or 4 |
| SYNC_ID | 0 or (8 × SYNC_ID_LEN) |

ORDQ—Order qualification code. The base station shall set this field to '00000000'.
SYNC_ID_INCL—Service Configuration synchronization identifier included indicator. The base station shall set this field to '1', if the SYNC_ID field is included in this message; otherwise, the base station shall set this field to '0'.
SYNC_ID_LEN—Service Configuration synchronization identifier length. If the SYNC_ID_INCL field is set to '0', the base station shall omit this field; otherwise, the base station shall include this field and set it as follows: The base station shall set this field to the length (in octets) of the SYNC_ID field included in this message. The base station shall set this field to a value larger than zero.
SYNC_ID—Service Configuration synchronization identifier. If the SYNC_ID_INCL field is set to '0', the base station shall omit this field; otherwise, the base station shall include this field and set it as follows: The base station shall set this field to the synchronization identifier corresponding to the service configuration conveyed by this message.

In another embodiment to the present invention, Handoff Messages may be used to communicate the synchronization information between the MS and the BS. The following Handoff Direction Messages are used to update the Sync_ID information in the corresponding sections of the TIA/EIA IS-2000.5-C, Signaling Standards for cdma2000 Spread Sprectrum Systems—Release C, May 2002 to communicate Sync_ID information that identifies services or components in a wireless network.

2.6.6.2.5 Handoff Messages 2.6.6.2.5.1 Processing of Forward Traffic Channel Handoff Messages If the mobile station receives any of the following messages, then the mobile station shall process the message as described.

[...]

11. Universal Handoff Direction Message: The mobile station shall process the message as follows:

In addition to the requirements in this section, if the SCR_INCLUDED field is included in this message and is set to '1' the mobile station shall also process this message in accordance with the requirements for the active service subfunction (see 2.6.4.1.2.2).

[...]

If NNSCR_INCLUDED field is included and set to '1' and SCR_INCLUDED field is either not included or included but set to '0', the mobile station shall process the received Non-negotiable Service Configuration Record as specified in 2.6.4.1.13 at the action time of this message. If the synchronization identifier is received from the base station corresponding to this updated service configuration:

The mobile station shall store (if included) the synchronization identifier received from the base station corresponding to this service configuration (SYNC_IDs=SYNC_IDr).

The mobile station shall store the current service configuration as specified in 2.6.4.1.2.2.5.1 at the action time of this message.

Otherwise, the mobile station shall set SYNC_ID$_s$ to NULL.

If SYNC_ID_INCL$_r$ is set to '1', NNSCR_INCLUDED field is not included or is included and set to '0', and SCR_INCLUDED is not included or is included and set to '0', the mobile station shall perform the following:

The mobile station shall store the synchronization identifier received from the base station (SYNC_ID$_s$=SYNC_ID$_r$).

If the currently used service configuration has a corresponding SYNC_ID, SID_INCL$_r$ is set to '0' and NID_INCL$_r$ is set to '0', the mobile station shall update the stored SYNC_ID value corresponding to the currently used service configuration with SYNC_ID$_r$.

If the currently used service configuration has a corresponding SYNC_ID, SID_INCL$_r$ is set to '1', or NID_INCL$_r$ is set to '1', the mobile station shall perform one of the following:

If either SID$_r$ or NID$_r$ included in the message is not equal to the stored SID or NID corresponding to the currently used service configuration, the mobile station shall store the current service configuration as specified in 2.6.4.1.2.2.5.1 at the action time of this message.

Otherwise, the mobile station shall update the stored SYNC_ID value corresponding to the currently used service configuration with SYNC_ID$_r$.

If the currently used service configuration does not have a corresponding SYNC_ID, the mobile station shall store the current service configuration as specified in 2.6.4.1.2.2.5.1 at the action time of this message.

When the message takes effect, the mobile station shall perform the following actions:
[ ... ]

Store the following parameters from the Universal Handoff Direction Message:
Universal Handoff Direction Message sequence number (HDM_SEQ$_s$=HDM_SEQ$_r$)
Forward power control subchannel relative gain (FPC_SUBCHAN_GAIN$_s$=FPC_SUBCHAN_GAIN$_r$).
If the mobile station uses FPC_SUBCHAN_GAIN$_s$, the mobile station shall perform the following:
[ ... ]
If SID_INCL$_r$ is equal to '1', the mobile station shall store the following:
System identification (SID$_s$=SID$_r$)
If NID_INCL$_r$ is equal to '1', the mobile station shall store the following:
Network identification (NID$_s$=NID$_r$)
If CH_IND$_r$ is equal to '101', the mobile station shall perform the following:
[ ... ]

3.7.3.3.2.36 Universal Handoff Direction Message
MSG_TAG: UHDM

| Field | Length (bits) |
|---|---|
| USE_TIME | 1 |
| ACTION_TIME | 0 or 6 |
| [...] | [...] |
| SYNC_ID_INCL | 0 or 1 |
| SYNC_ID_LEN | 0 or 4 |

-continued

| Field | Length (bits) |
|---|---|
| SYNC_ID | 0 or (8 × SYNC_ID_LEN) |
| [...] | [...] |

SYNC_ID_INCL—Service Configuration synchronization identifier included indicator. If the SCR_INCLUDED field is included and is set to '1' or the NNSCR_INCLUDED field is included and is set to '1',or P_REV_IN_USE is equal or greater than 11, the base station shall include this field; otherwise, the base station shall omit this field. If included, the base station shall set this field as follows: The base station shall set this field to '1' if the SYNC_ID field is included in this message; otherwise, the base station shall set this field to '0'.

SYNC_ID_LEN—Service Configuration synchronization identifier length. If the SYNC_ID_INCL field is not included or is included and is set to '0', the base station shall omit this field; otherwise, the base station shall include this field and set it as follows: The base station shall set this field to the length (in octets) of the SYNC_ID field included in this message. The base station shall set this field to a value larger than zero.

SYNC_ID—Service Configuration synchronization identifier. If the SYNC_ID_INCL field is not included or is included and is set to '0', the base station shall omit this field; otherwise, the base station shall include this field and set it as follows: If the SCR_INCLUDED field is included and is set to '1' or the NNSCR_INCLUDED field is included and is set to '1',the base station shall set this field to the synchronization identifier corresponding to the service configuration conveyed by this message; otherwise, the base station shall set this field to the updated synchronization identifier corresponding to the current service configuration.

[ ... ]

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

It is, therefore, intended by the appended claims to cover any and all such applications, modifications, and embodiments within the scope of the present invention.

What is claimed is:

1. A method of operating a wireless communications network, the method comprising:
receiving synchronization information in a wireless communication network component using network messaging, wherein the synchronization information is used for synchronization and the network messaging is at least a one of a Release Order Message, an Extended Release Order Message and an Extended Release Mini Message; and
implementing a network function other than synchronization by using the synchronization information as an index to search a database to identify the network function.

2. A method of operating as set forth in claim 1, wherein the synchronization information is a Sync_ID.

3. A method of operating as set forth in claim 2, wherein the synchronization information further comprises multiple Sync$_{13}$ IDs.

4. A method of operating as set forth in claim 1, wherein the network function includes identifying a network component.

5. A method of operating as set forth in claim 1, wherein the network function includes a network service.

6. A method of managing a synchronization identifier in a wireless communication network, the method comprising:
embedding a first synchronization identifier in a release message, the first synchronization identifier including current configuration status information and additional information that implements a network function other than synchronization, the additional information comprising at least a one of: additional service information and additional network component information; and
transmitting the release message to enable update of a second synchronization identifier using the first synchronization identifier in the release message.

7. A method of managing as set forth in claim 6, wherein the first synchronization identifier is a base station synchronization identifier (BSSI) and the second synchronization identifier is a mobile station synchronization identifier (MSSI).

8. A method of managing as set forth in claim 6, wherein the second synchronization identifier is a mobile station synchronization identifier.

9. A method of managing as set forth in claim 6, wherein the release message is transmitted from a mobile station to a base station.

10. A method of managing as set forth in claim 6, wherein the release message is transmitted from a base station to a mobile station.

11. The method of managing as set forth in claim 6, wherein the release message is transmitted on a traffic channel.

12. The method of managing as set forth in claim 6, wherein a mobile station is in an idle state when it receives the release message.

13. The method of managing as set forth in claim 7, wherein the additional information includes additional service information comprising at least a one of mobile Internet Protocol (IP) information and Generic Routing Encapsulation (GRE) tunnel information.

14. The method of managing as set forth in claim 7, wherein the release message includes multiple base station synchronization identifiers (BSSIs).

* * * * *